(12) United States Patent
Tange

(10) Patent No.: US 12,319,191 B2
(45) Date of Patent: Jun. 3, 2025

(54) VEHICLE BED LOADING RAMP SYSTEMS

(71) Applicant: TDE LLC, Lakeland, MN (US)

(72) Inventor: Andrew M Tange, Lakeland, MN (US)

(73) Assignee: TDE LLC, Lakeland, MN (US)

( * ) Notice: Subject to any disclaimer, the term of this patent is extended or adjusted under 35 U.S.C. 154(b) by 257 days.

(21) Appl. No.: 18/056,584

(22) Filed: Nov. 17, 2022

(65) Prior Publication Data

US 2023/0150414 A1 May 18, 2023

Related U.S. Application Data

(60) Provisional application No. 63/264,229, filed on Nov. 17, 2021.

(51) Int. Cl.
*B60P 1/43* (2006.01)
*B60P 3/06* (2006.01)

(52) U.S. Cl.
CPC ............... *B60P 1/433* (2013.01); *B60P 3/062* (2013.01)

(58) Field of Classification Search
CPC ........ B60P 1/433; B60P 3/062; B60Q 1/2661; B60Q 1/30
USPC .......................................... 414/462, 480, 537
See application file for complete search history.

(56) References Cited

U.S. PATENT DOCUMENTS

| | | | | |
|---|---|---|---|---|
| 2,727,781 A * | 12/1955 | D'Eath | ................. | B60P 1/6454 296/61 |
| 3,339,968 A * | 9/1967 | Hall | ........................ | B60P 1/435 296/61 |
| 3,352,440 A * | 11/1967 | Wilson | ..................... | B60P 1/435 296/61 |
| 3,580,404 A * | 5/1971 | Moser | ........................ | B60P 1/43 14/71.1 |
| 3,687,314 A * | 8/1972 | Haugland | ............... | B60P 3/062 414/537 |
| 3,726,423 A * | 4/1973 | Miron | ..................... | B60P 3/062 296/61 |
| 3,837,663 A * | 9/1974 | Ness | ......................... | B60P 1/43 280/8 |
| 5,794,291 A * | 8/1998 | Olaussen | .................. | B60P 1/43 280/8 |
| 5,899,466 A * | 5/1999 | Twaits, Jr. | ................ | B60P 1/43 280/47.24 |
| 6,533,337 B1 | 3/2003 | Harshman et al. | | |
| 6,634,848 B2 | 10/2003 | Henderson | | |
| 6,764,123 B1 | 7/2004 | Bilyard | | |

(Continued)

*Primary Examiner* — James Keenan
(74) *Attorney, Agent, or Firm* — Leber IP Law; Celia H. Leber

(57) ABSTRACT

Vehicle bed loading ramp systems are disclosed. Systems include (a) a first section comprising a rigid framework defining a pair of ramps, the first section having first outer edges extending parallel to the ramps; (b) a second section comprising a rigid framework defining a pair of ramps, the second section having second outer edges extending parallel to the ramps; (c) at least one wheel mounted adjacent each of the first outer edges; and (d) a pair of locking hinge assemblies mounted to extend between one of the first outer edges and an adjacent one of the second outer edges to provide a hinged coupling between the first section and the second section. When the locking hinge assemblies are locked open the ramps of the first and second sections are colinearly arranged and capable of supporting the weight of an off-road vehicle to be loaded without collapsing.

18 Claims, 12 Drawing Sheets

(56) References Cited

U.S. PATENT DOCUMENTS

| | | | |
|---|---|---|---|
| 6,767,171 B2* | 7/2004 | Kelly | B60P 1/43 |
| | | | 414/475 |
| 7,350,255 B2 | 4/2008 | Zhang | |
| 7,832,975 B1 | 11/2010 | Mitchell | |
| 8,292,565 B1* | 10/2012 | Ruff | B60P 1/43 |
| | | | 414/812 |
| 8,511,734 B2 | 8/2013 | Hutchins, Jr. et al. | |
| 8,894,345 B1 | 11/2014 | Richins et al. | |
| 10,589,655 B2* | 3/2020 | Guido | B60P 1/6427 |
| 2003/0213072 A1* | 11/2003 | Myrick | B60P 1/43 |
| | | | 14/69.5 |
| 2004/0009055 A1* | 1/2004 | Scherle | B60P 1/433 |
| | | | 414/537 |
| 2005/0196260 A1* | 9/2005 | Asfeld | B60P 3/062 |
| | | | 414/537 |
| 2007/0092363 A1* | 4/2007 | Morfitt | B60P 3/062 |
| | | | 414/467 |
| 2007/0262602 A1* | 11/2007 | Nagle | B62D 33/0273 |
| | | | 296/51 |
| 2013/0343847 A1 | 12/2013 | Freeman | |
| 2016/0129824 A1 | 5/2016 | Adriani | |
| 2017/0253445 A1* | 9/2017 | Giannatti | B65G 69/30 |
| 2022/0025703 A1* | 1/2022 | Barker | E06C 1/14 |

\* cited by examiner

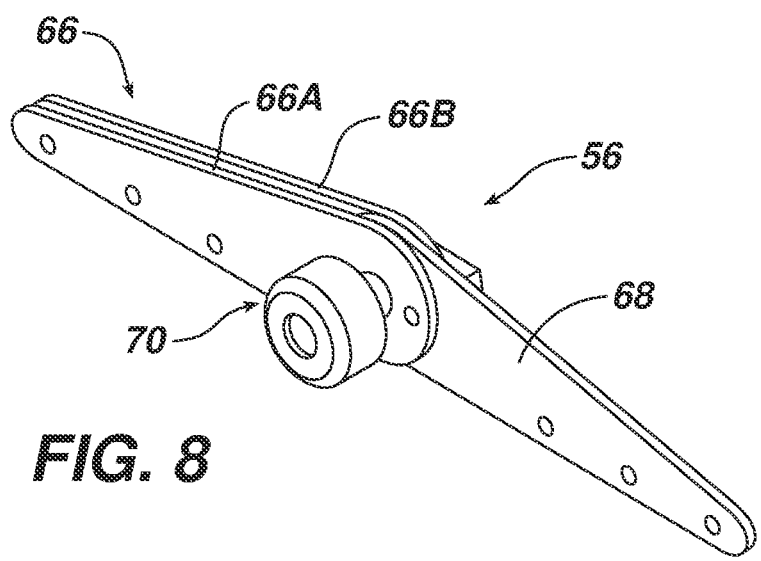
FIG. 8
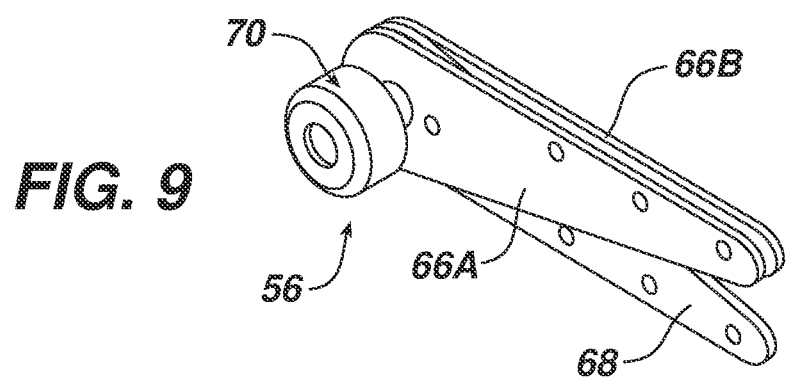
FIG. 9
FIG. 10
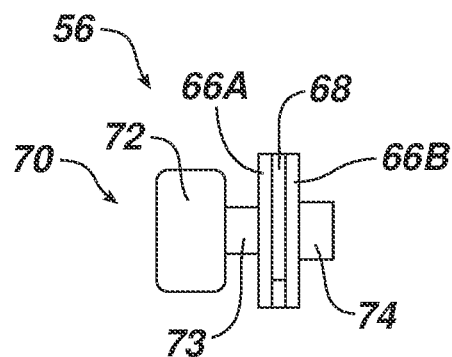
FIG. 11
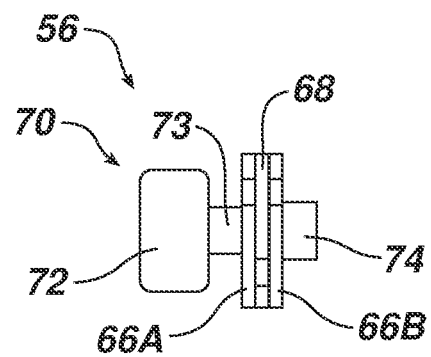

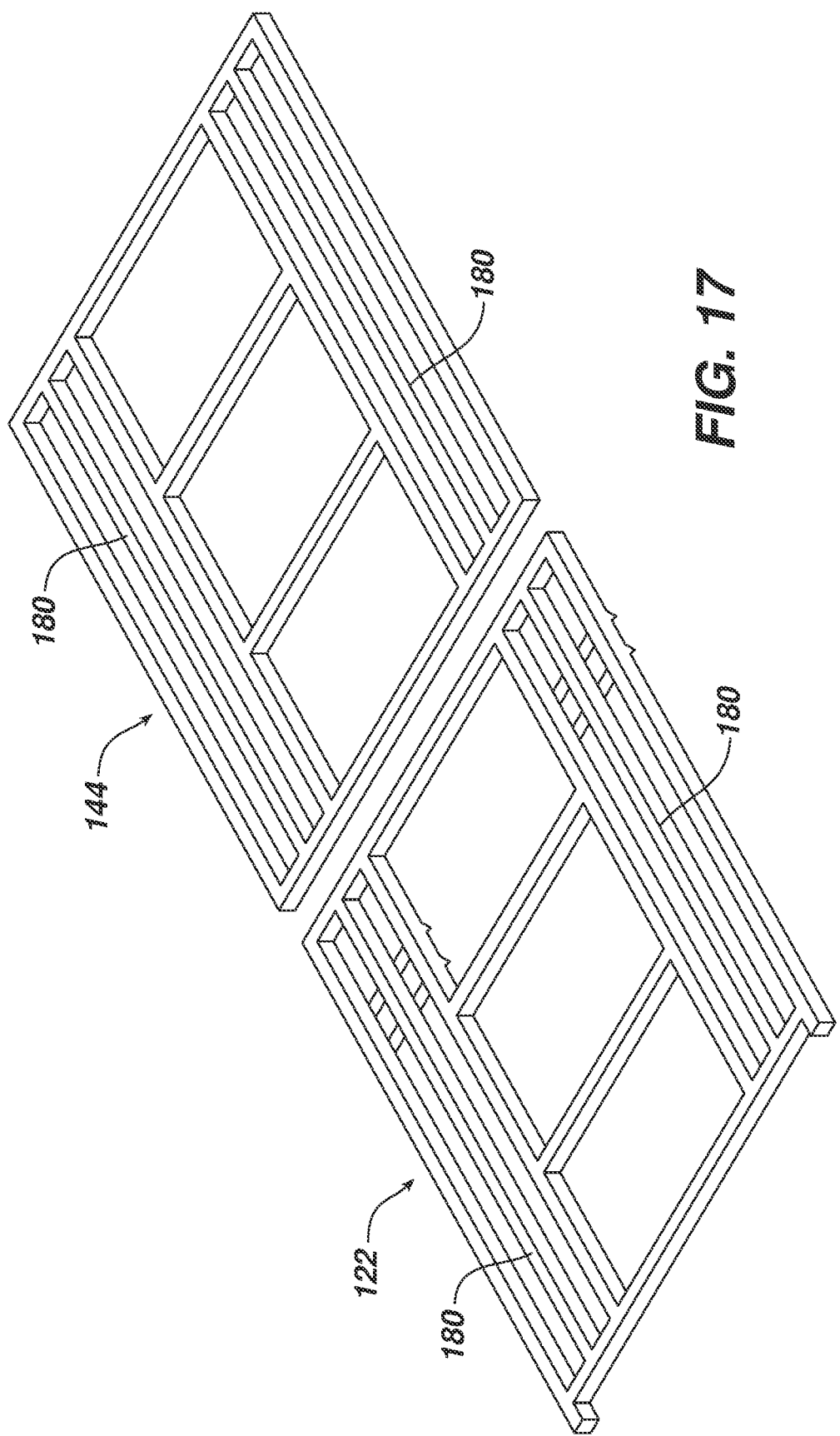

VEHICLE BED LOADING RAMP SYSTEMS

RELATED APPLICATION

This application claims priority from United States Provisional Patent Application No. 63/264,229, filed Nov. 17, 2021, the entire disclosure of which is incorporated herein by reference.

BACKGROUND

It can be challenging to safely load a heavy off-road vehicle (ORV), such as a snowmobile, all-terrain vehicle or utility terrain vehicle, into the bed of an over-the-road vehicle such as a pick-up truck or the like. ORVs are heavy and can cause serious injury if the user loses control during loading, for example when driving an ORV up a ramp and into a truck bed.

Loading ramps are available that allow the user to drive the ORV just onto the ramp, and then tipping the ramp and sliding the ramp, with the ORV on it, into the truck bed. Such ramps are sometimes referred to as "easy load snowmobile ramps".

SUMMARY

The present disclosure features vehicle bed loading ramp systems of the "easy load" type that include desirable features that make the systems easy and safe to use, store and transport.

In one aspect, the disclosure features a vehicle bed loading ramp system comprising: (a) a first section comprising a rigid framework defining a pair of ramps, the first section having first outer edges extending parallel to the ramps; (b) a second section comprising a rigid framework defining a pair of ramps, the second section having second outer edges extending parallel to the ramps; (c) at least one wheel mounted adjacent each of the first outer edges; and (d) a pair of locking hinge assemblies, each locking hinge assembly being mounted to extend between one of the first outer edges and an adjacent one of the second outer edges to provide a hinged coupling between the first section and the second section. When the locking hinge assemblies are locked in an open position the ramps of the first section are colinearly arranged with the ramps of the second section and capable of supporting the weight of an off-road vehicle to be loaded without collapsing.

In some implementations the system includes one or more of the following features.

The system may include two wheels mounted adjacent each of the first outer edges. The two wheels on either outer edge are commonly mounted on a bracket, and positioned such that a portion of each wheel is disposed within the framework of the first section.

The locking hinge assemblies may each comprise an outer bracket portion having a pair of spaced leaves, an inner bracket portion having a single leaf configured to be received between the spaced leaves during folding, and a cylindrical locking hinge extending through coaxially arranged bores in the outer and inner bracket portions, hingedly joining the outer and inner bracket portions.

The outer bracket portion may be attached to one of the first and second outer edges and the inner bracket is attached to the other of the first and second outer edges.

The locking hinge assemblies may be mounted to the first and second sections in a manner so that a dead space is provided between a lower edge of the first section and an upper edge of the second section to facilitate folding.

The locking hinge assemblies may be configured to lock the system in a closed position. The cylindrical locking hinge comprises an inner lock kit for telescoping ladders.

The system may further include a pair of wheels disposed on an upper edge of the first section or a lower edge of the second section to facilitate rolling transport of the system when folded.

The system may further include LED lighting mounted on a lower edge of the second section.

In another aspect, the disclosure features methods of using the systems described herein. For example, the disclosure features a method of loading an off-road vehicle (ORV) into a vehicle bed, the method comprising: (a) providing, in a folded position, a vehicle bed loading ramp system that includes: (i) a first section comprising a rigid framework defining a pair of ramps, the first section having first outer edges extending parallel to the ramps; (ii) a second section comprising a rigid framework defining a pair of ramps, the second section having second outer edges extending parallel to the ramps; (iii) at least one wheel mounted adjacent each of the first outer edges; and (iv) a pair of locking hinge assemblies, each locking hinge assembly being mounted to extend between one of the first outer edges and an adjacent one of the second outer edges to provide a hinged coupling between the first section and the second section; (b) pivoting the first section and second section about the locking hinge assemblies to move the system to an open position;
(c) locking the locking hinge assemblies in an open position such that the ramps of the first section are colinearly arranged with the ramps of the second section;
(d) positioning the system such that the first section rests against the tailgate of a vehicle having a bed and a lower edge of the second section contacts the ground;
(e) driving an ORV onto the ramps; and (f) using the wheels to roll the system and ORV into the bed while lifting up on the second section.

In some implementations, the method includes one or more of the following additional steps.

The method further includes securing the ORV to the bed of the truck.

The method further includes using the wheels to roll the system and ORV out of the bed while lowering the second section to the ground. The method further includes then driving the ORV off of the system.

The method further includes unlocking the locking hinge assemblies and moving the first section and second section back to the folded position.

The method further includes using a pair of wheels disposed on an upper edge of the first section or a lower edge of the second section to facilitate rolling transport of the folded system to a storage location.

The method further includes activating lighting disposed on a rear edge of the second section, e.g., before driving with the loaded ORV.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWINGS

FIG. 8 is an enlarged perspective view of one of the locking hinge assemblies of the system, in an extended position.

FIG. 9 is a perspective view of the locking hinge in a folded position.

FIG. 10 is an end view of the locking hinge portion of the hinge assembly, seen from a first direction.

FIG. 11 is an end view of the locking hinge seen from a second direction.

FIG. 17 is a perspective view of a rigid framework according to an alternative embodiment.

DETAILED DESCRIPTION

Figure 1:
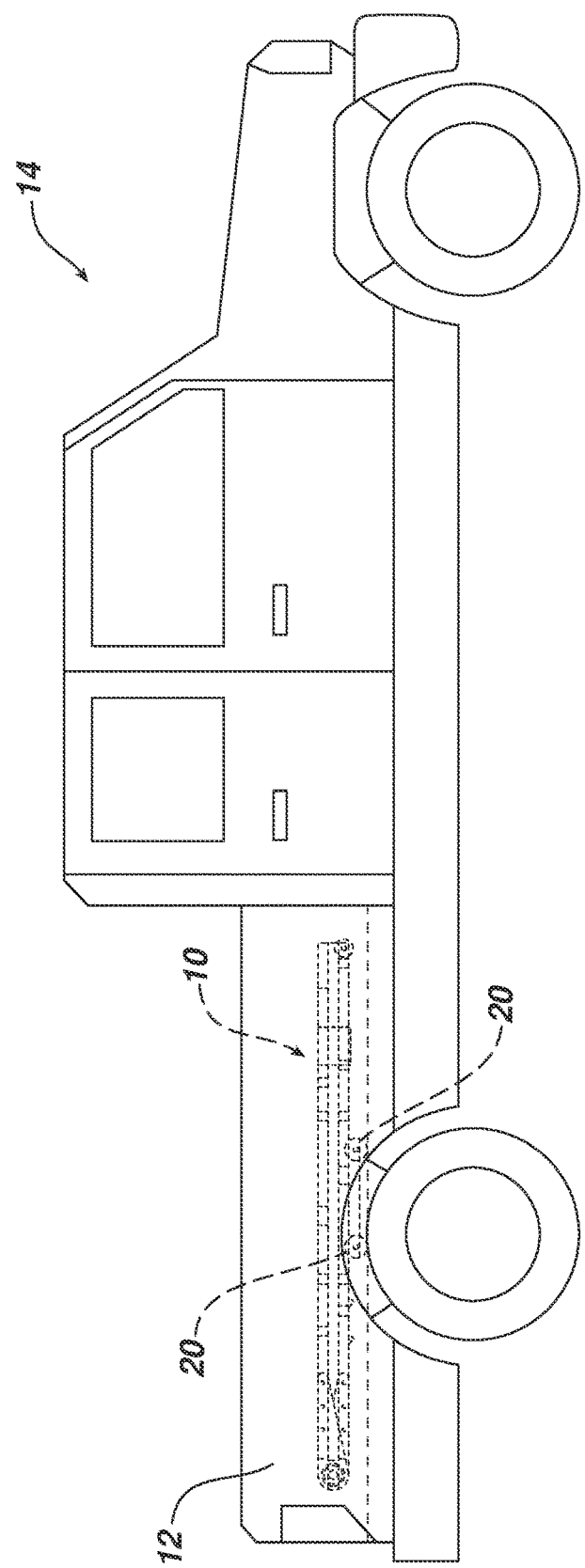
FIG. 1 is a diagrammatic side view of a vehicle bed loading ramp system according to one implementation, shown in phantom lines, folded in the bed of a pickup truck.

Referring to FIG. 1, a vehicle bed loading ramp system 10 according to one implementation is shown folded in the bed 12 of a truck 14. In this implementation, the system 10 is configured to fit closely within the confines of the truck bed so as to minimize forward and back movement of the system 10 during driving. However, system 10 can also be used in longer beds if desired and simply secured in place. The system 10 folds to a low profile shape, as will be discussed further below, and locks safely in the closed position, features that allow cargo to be stacked on the folded rack in the truck bed. The folded system 10 can also be stored in a garage or other storage area and easily transported to the truck 14, as will be discussed later.

Figure 2:
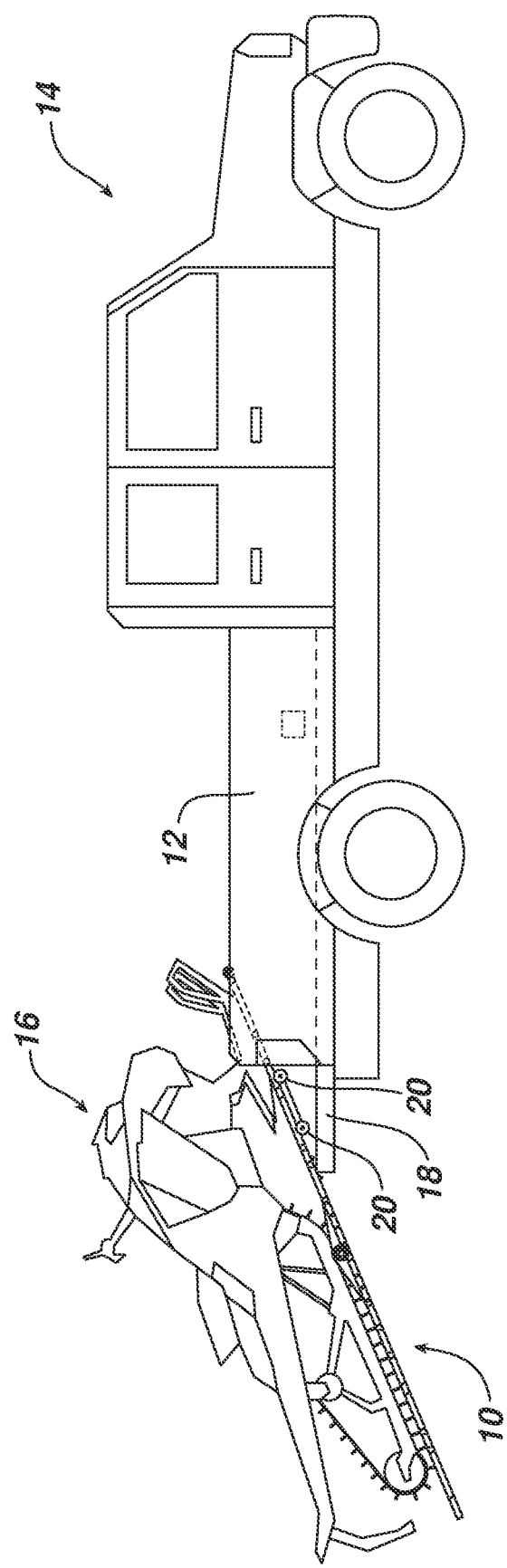
FIG. 2 is a diagrammatic side view of the system in a deployed (extended and locked) position, with a snowmobile loaded on the system.
Figure 3:
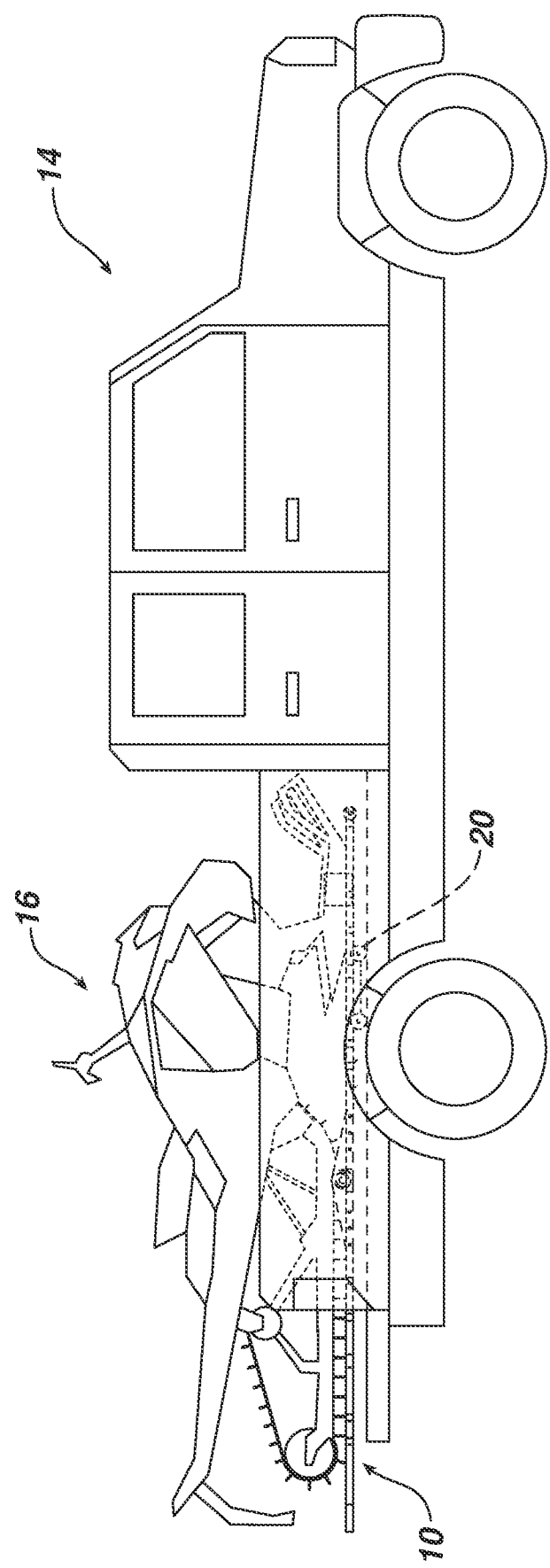
FIG. 3 is a diagrammatic side view of the system and snowmobile loaded into the bed of the truck.

When the system 10 is in an open and locked position a user can lean the system 10 up against the tailgate 18 of the truck 14 such that the system contacts the edge of the tailgate which acts as a fulcrum. Then the user can drive an ORV, e.g., a snowmobile 16 as shown in FIG. 2, onto the system 10. The user then dismounts the ORV, walks to the back of the system 10, and easily tips the rear end up and uses wheels 20 to slide the system 10 into the truck bed 12 (FIG. 3). The ORV can then be secured to the truck bed for transport, e.g., with bungees or cam straps secured to the truck bed and releasably fastened to either side of the ORV.

To unload the ORV the user simply rolls the system back using the wheels and pivots it down to rest on the ground. Then the user can either pull the ORV off or reverse drive off.

Figure 4:
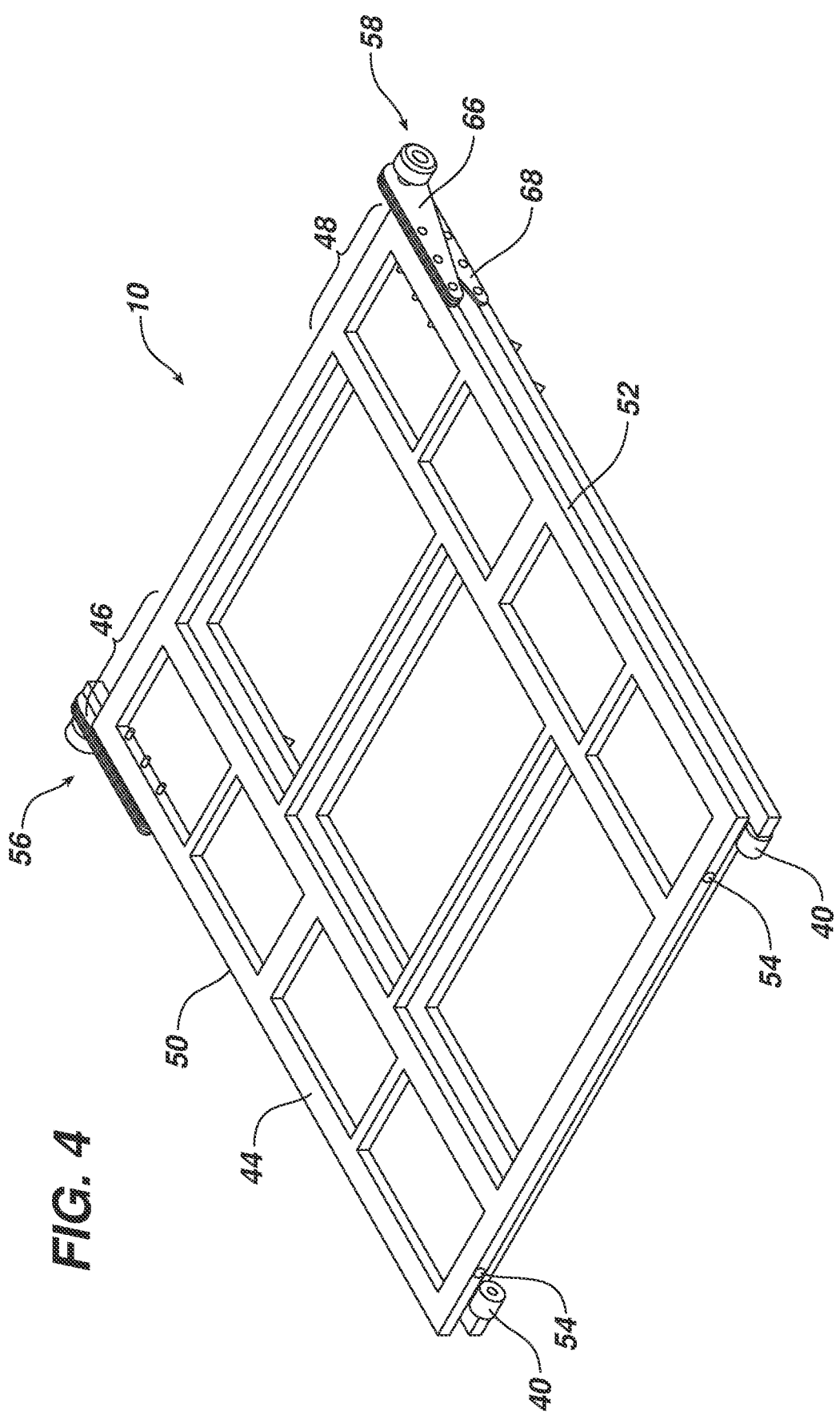
FIG. 4 is a perspective view of the system in the folded position shown in FIG. 1.
Figure 5:
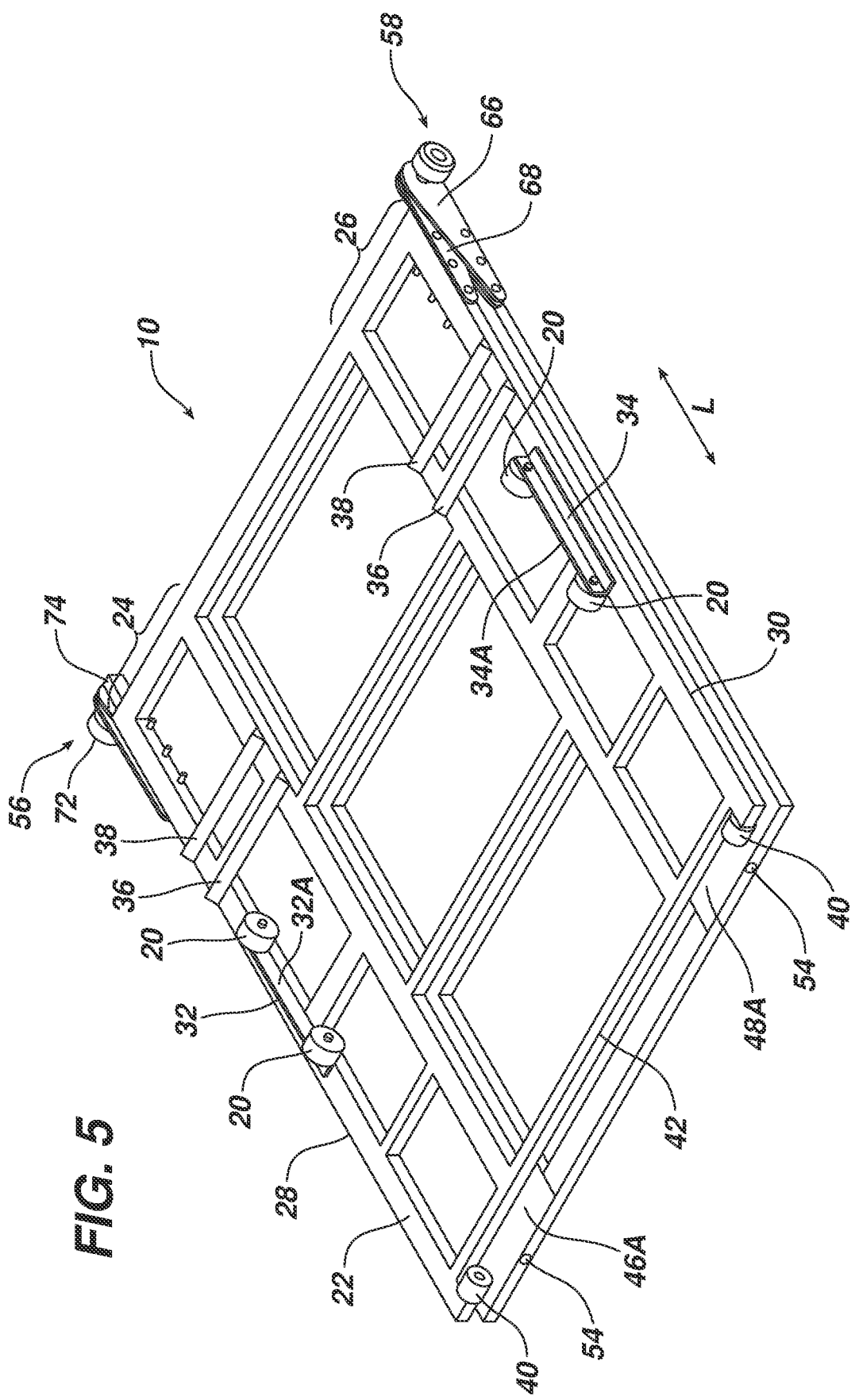
FIG. 5 is a perspective view of the system in the folded system taken from the opposite side.
Figure 6:
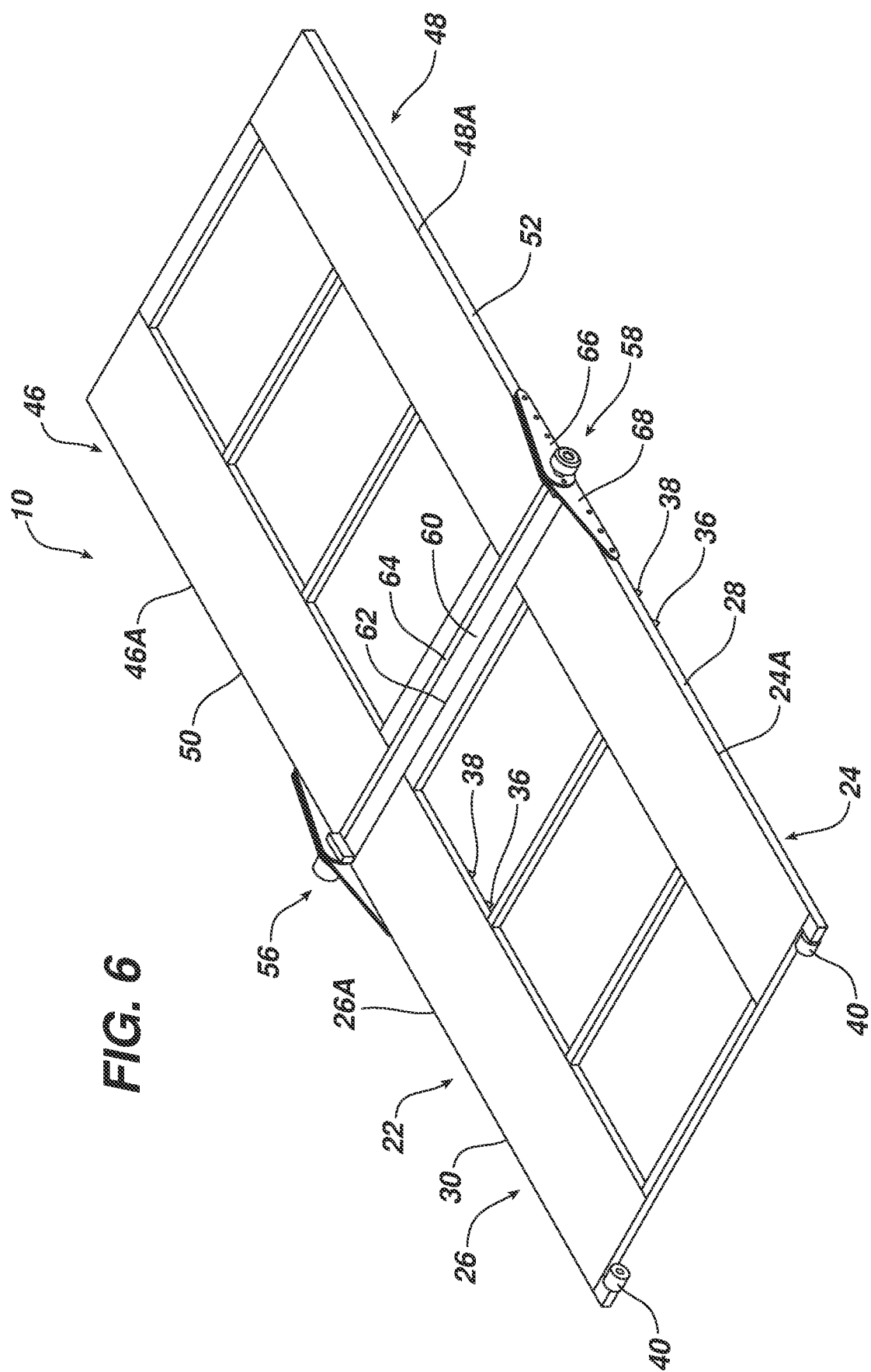
FIG. 6 is a perspective view of the system in the extended, locked position shown in FIG. 2, seen from the top.

Referring now to FIGS. 4-7, the system 10 includes a first section 22 having a rigid framework defining a pair of ramps 24 and 26 (FIGS. 5 and 6). The framework may be formed of a high strength metal, for example, of aluminum or welded structural steel, and may be powder coated for durability and aesthetic appeal. Each ramp is covered with a traction layer 24A, 26A, as shown in FIG. 6, which may be, for example, traction mats or grip glides such as are conventionally used on snowmobile ramps. The first section 22 has a pair of outer edges 28, 30. A pair of sections of angle iron 32, 34, are mounted opposite each other along the length L of the first section, parallel with and adjacent to the outer edges. The sections of angle iron are mounted such that their vertical portions 32A, 34A that extend away from the framework are disposed towards the center of the first section 22. This positioning allows wheels 20, which are mounted on the vertical portions, to extend into the open areas of the ramps adjacent the wheels, thereby allowing relatively large diameter and width wheels (e.g., 2 to 4 inch diameter, 1 to 3 inch width) to be used without sacrificing the low profile configuration of the system. Mounting the wheels 20 adjacent the outer edges 28, 30 provides a wide, stable base when the ramp is rolled into the truck bed using the wheels.

The first section also includes two pairs of stops 36, 38 (FIG. 5), positioned on the lower side of each of the ramps, which are configured to engage the edge of the tailgate 18 as shown in FIG. 2. In addition, the first section includes a pair of forward wheels 40 which are mounted adjacent to an upper edge 42 of the first section 22 and are positioned such that their rolling surfaces are perpendicular to the length L of first section 22 and extend slightly beyond edge 42. These wheels are configured to allow the user to roll the folded system 10, as will be discussed further below.

Figure 7:
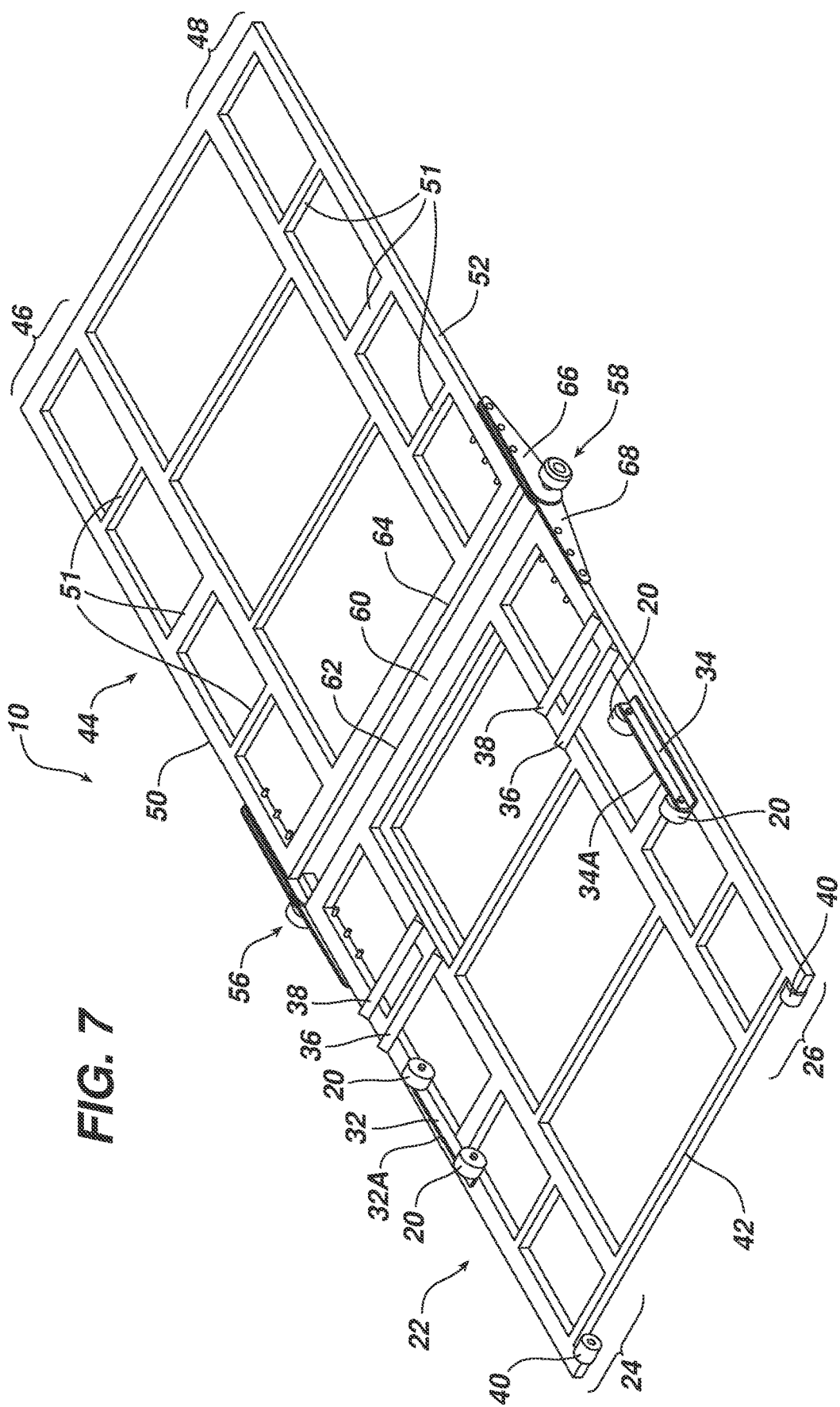
FIG. 7 is a perspective view of the system in the extended, locked position, seen from below.

Referring now to FIGS. 4 and 7, system 10 further includes a second section 44 also having a rigid framework that defines a pair of ramps 46, 48, having outer edges 50, 52. Like ramps 24, 26, ramps 46 and 48 are covered with a traction layer 46A and 48B on their upward-facing surfaces (FIG. 6). As shown in FIGS. 4 and 5, second section 44 also includes lighting 54, e.g., a pair of LED lights as shown. The lighting 54 is powered by a power cord, e.g., a coiled cord (not shown), that is plugged into the trailer hitch of the truck.

The first section 22 and second section 44 are joined by a pair of substantially identical locking hinge assemblies 56, 58. An open area 60 is provided between the opposed edges 62, 64 of the first section 22 and second section 44 to facilitate folding. Each of the locking hinge assemblies is mounted to extend between one of the outer edges of the first section and an adjacent outer edge of the second section to provide a hinged coupling between the first section and the second section.

Figure 12:
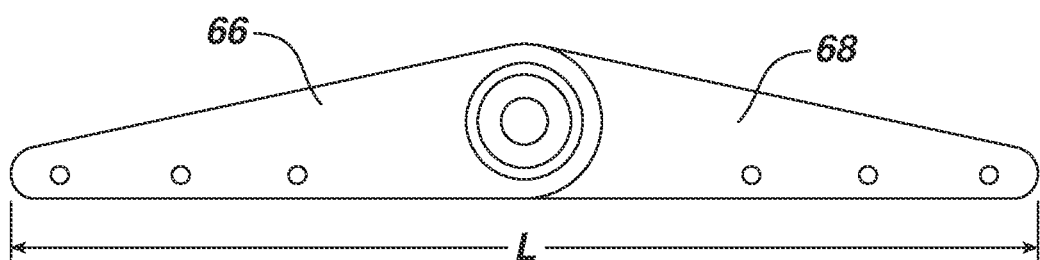
FIG. 12 is a side view of the locking hinge assembly in the extended position.
Figure 13:
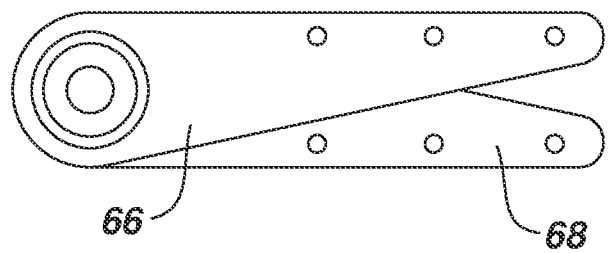
FIG. 13 is a side view of the locking hinge assembly in the folded position.

Referring now to FIGS. 8 and 9, each of the locking hinge assemblies 56, 58 includes an outer bracket portion 66 having a pair of spaced leaves 66A, 66B, and an inner bracket portion 68 having a single leaf configured to be received between the spaced leaves 66A, 66B during folding of the system 10. One or more spacers (not shown) are provided between leaves 66A and 66B to maintain a uniform spacing between the leaves along their length. The bracket portions are formed of structural steel or a material having similar strength properties. The relatively long length L of the bracket (in the extended position shown in FIG. 12), e.g., from about 15 to 30 inches, in some cases from about 17 to 25 inches, helps to distribute the load applied by the ORV during loading over a relatively large area on the outer edges. The bracket portions may be mounted on the outer edges by bolting, as shown, or by welding if desired. Preferably, multiple bolts are used on each of the bracket portions (e.g., at least three on each bracket portion, as shown) for redundancy and load distribution.

Figure 14:
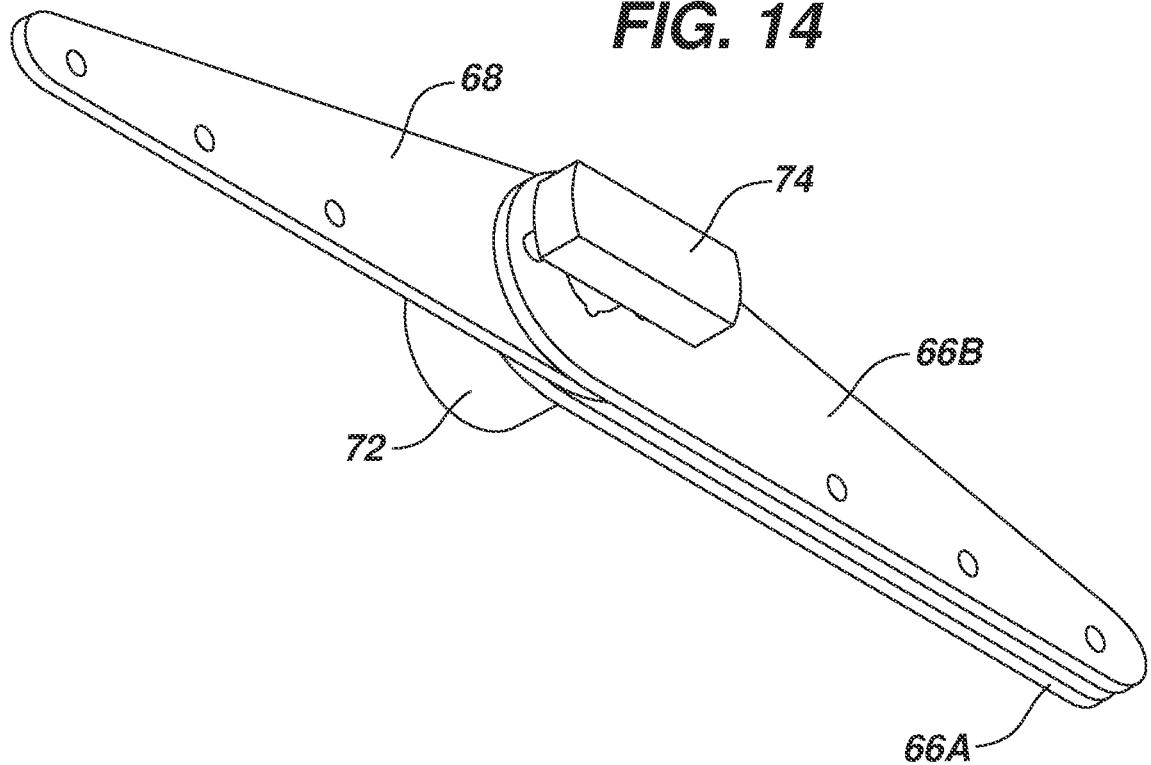
FIG. 14 is similar to FIG. 8, but taken from the opposite side of the locking hinge assembly.
Figure 15:
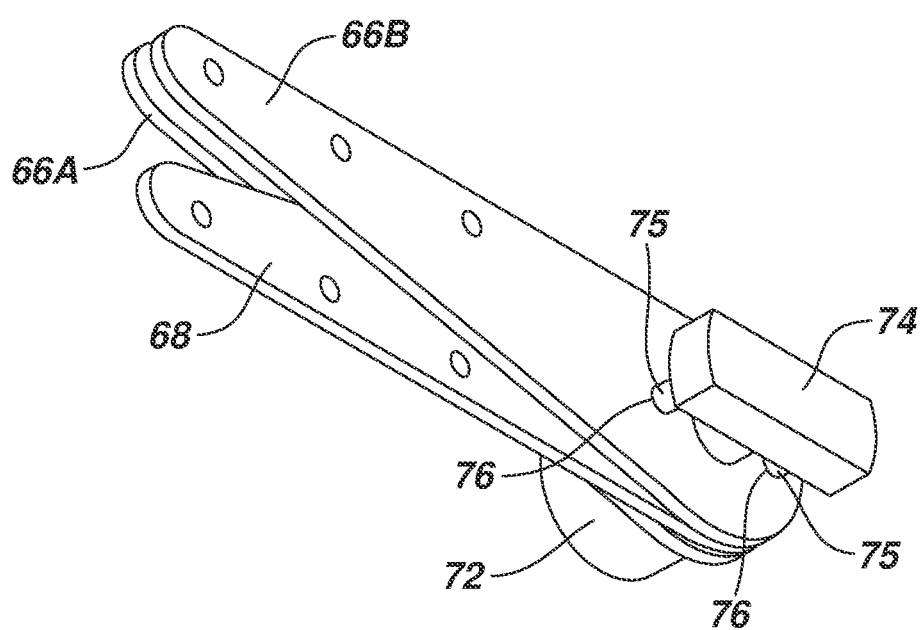
FIG. 15 is similar to FIG. 9, but taken from the opposite side.

Each of the locking hinge assemblies also includes a cylindrical locking hinge 70 that extends through coaxially arranged bores in the outer and inner bracket portions. The hinge 70 may be, for example, the type of locking hinge that is used to releasably lock the sections of extendable ladders. The cylindrical locking hinge 70 is configured to lock the first and second sections in place both in the open position and the folded position of the system 10. Hinge 70 is mounted in a fixed position relative to the outer bracket portion 66, and includes a cylindrical portion 72, and a shaft 73 (FIG. 10) that extends through the bores in the outer and inner bracket portions. The hinge also includes a mount 74 extending from the shaft 73 and carrying a pair of pins 75, the free ends of which (not shown) face towards the cylindrical portion 72. The hinge 70 is released by pushing cylindrical portion 72 inward along its axis to release pins 75 (FIG. 15) on the opposite side of the hinge from corresponding holes 76 that extend through the inner and outer bracket portions. The inner bracket portion can then be rotated to the locked extended (FIG. 14) or locked folded (FIG. 15) position and the cylindrical portion 72 released to allow the pins 75 to be received by the holes 76 fixing the inner and outer bracket portions in the desired relative position. The hinge is preferably spring loaded so that the pins will be biased towards the locked position and be pushed into that position as soon as the holes align with the pins.

The system 10 has a number of advantages from an ergonomic and safety standpoint. Because system 10 can be folded, it can be easily transported by a user, both within the truck bed and from a storage location (e.g., a garage or shed) and the truck. The wheels 40 allow the folded system to be easily rolled by the user, using the area of the framework adjacent to edges 62, 64 as a handle. Because the cylindrical locking hinge 70 locks the sections in the folded position there is no danger of the user's fingers getting pinched when handling the folded system 10. The sections also do not bounce when the system 10 is in the folded position during transport in the truck bed over uneven terrain.

The robust nature of the locking hinge assemblies allows a foldable system to be used despite the very heavy loads imposed on the ramps during loading of an ORV.

Other safety features include the lighting on the second section, which provides supplemental tail lighting during driving, when the tail lights of the truck may be partially obscured by the overhanging open tailgate.

OTHER EMBODIMENTS

A number of embodiments have been described. Nevertheless, it will be understood that various modifications may be made without departing from the spirit and scope of the disclosure.

For example, the ramp system may include more lights than described above, e.g., blinkers and/or lights of different colors, or the lights can be omitted. The size of the device can also be scaled for use with other sizes and types of vehicles.

In addition, while angle iron is shown and described above for mounting the wheels, the wheels may be mounted in other manners, for example using sections of square metal tubing.

Figure 16:
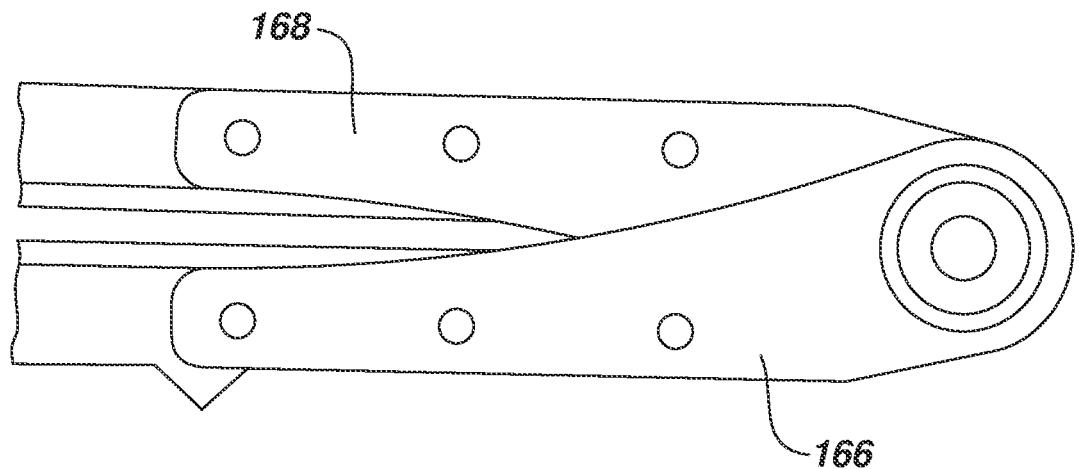
FIG. 16 is a side view of a locking hinge assembly according to an alternate embodiment.
Figure 16A:
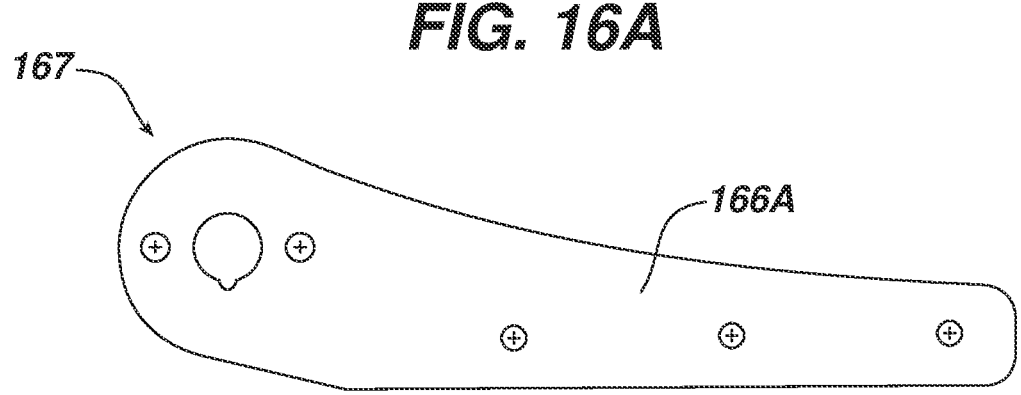
FIG. 16A is a side view of a leaf of the hinge assembly shown in FIG. 16.
Figure 16B:
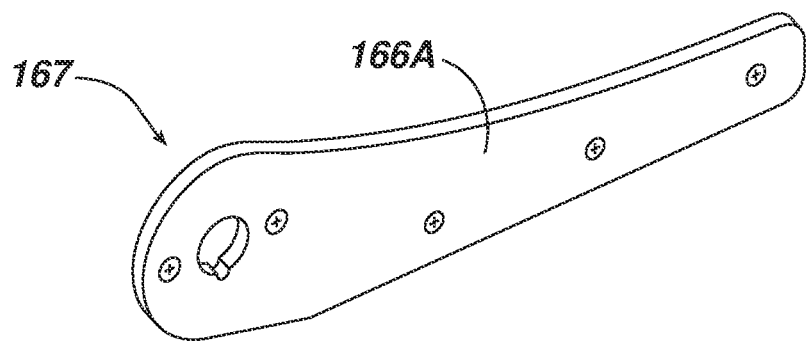
FIG. 16B is a perspective view of the leaf shown in FIG. 16A.

Moreover, the locking hinge assembly may have a different configuration. For example, as shown in FIGS. 16-16B a locking hinge assembly 156 includes an outer bracket portion 166 (only half of which is visible in FIG. 16) and an inner bracket portion 168. In this embodiment, the leaves of the outer bracket 166 (e.g., leaf 166A, shown in FIGS. 16A and 16B) are curved upward at the end 167 at which they are joined. This curvature moves the pivot point of the hinge higher, as shown in FIG. 16. This modification allows thicker (and thus more structurally robust) leaves to be used without the leaves interfering with each other during folding and unfolding. In some embodiments, each leaf of the locking hinge assembly has a thickness of at least 0.20 inch, in some cases at least 0.25".

Referring to FIG. 17, in another alternative embodiment a different framework may be used for the ramps in the first and second sections of the ramp system. In first section 122 and second section 144, rather than being reinforced by a plurality of transversely extending struts 51, as shown in FIG. 7, a single longitudinally extending beam 180 that runs the length of the section can be provided. This configuration is generally easier to manufacture, as welding time is reduced, and still provides good structural integrity.

Accordingly, other embodiments are within the scope of the following claims.

What is claimed is:

1. A vehicle bed loading ramp system comprising:
a first section comprising a rigid framework defining a first pair of ramps, the first section having a left first outer edge and a right first outer edge, the left and right first outer edges extending parallel to the first pair of ramps, the first section having a front edge configured to engage an edge of a tailgate of a vehicle;
a first pair of wheels mounted adjacent the left first outer edge;
a second pair of wheels mounted adjacent the right first outer edge and opposite the first pair of wheels across a width of the rigid framework;
a second section comprising a rigid framework defining a second pair of ramps, the second section having second outer edges extending parallel to the second pair of ramps;
and
a pair of locking hinge assemblies, each locking hinge assembly being mounted to extend between one of the first outer edges and an adjacent one of the second outer edges to provide a hinged coupling between the first section and the second section;
wherein when the locking hinge assemblies are locked in an open position the first pair of ramps are colinearly arranged with the second pair of ramps and capable of supporting the weight of an off-road vehicle to be loaded without collapsing.

2. The system of claim 1 wherein the locking hinge assemblies each comprise an outer bracket portion having a pair of spaced leaves, an inner bracket portion having a single leaf configured to be received between the spaced leaves during folding, and a cylindrical locking hinge extending through coaxially arranged bores in the outer and inner bracket portions, hingedly joining the outer and inner bracket portions.

3. The system of claim 2 wherein the outer bracket portion is attached to one of the first and second outer edges and the inner bracket is attached to the other of the first and second outer edges.

4. The system of claim 2 wherein the cylindrical locking hinge comprises pins that are releasably received by corresponding holes in the outer and inner bracket portions to fix the position of the inner bracket portion relative to the outer bracket portion.

5. The system of claim 1 wherein the locking hinge assemblies are mounted to the first and second sections in a manner so that a dead space is provided between a lower edge of the first section and an upper edge of the second section to facilitate folding.

6. The system of claim 1 wherein each pair of wheels is commonly mounted on a bracket, and positioned such that a portion of each wheel is disposed within the framework of the first section.

7. The system of claim 1 wherein the locking hinge assemblies are configured to lock the system in a closed position.

8. The system of claim 1 further comprising a pair of wheels disposed on an upper edge of the first section or a lower edge of the second section to facilitate rolling transport of the system when folded.

9. The system of claim 1 further comprising LED lighting mounted on a lower edge of the second section.

10. The system of claim 1 wherein the first section further comprises two pairs of stops, one pair positioned on the lower side of each of the first pair of ramps, the stops being configured to engage the edge of the tailgate.

11. A method of loading an off-road vehicle (ORV) into a vehicle bed, the method comprising:
  providing, in a folded position, a vehicle bed loading ramp system comprising:
    a first section comprising a rigid framework defining a first pair of ramps, the first section having a left first outer edge and a right first outer edge, the left and right first outer edges extending parallel to the first pair of ramps, the first section having a front edge configured to engage an edge of a tailgate of a vehicle;
    a first pair of wheels mounted adjacent the left first outer edge;
    a second pair of wheels mounted adjacent the right first outer edge and opposite the first pair of wheels across a width of the rigid framework;
    a second section comprising a rigid framework defining a second pair of ramps, the second section having second outer edges extending parallel to the second pair of ramps;
    and
    a pair of locking hinge assemblies, each locking hinge assembly being mounted to extend between one of the first outer edges and an adjacent one of the second outer edges to provide a hinged coupling between the first section and the second section;
  pivoting the first section and second section about the locking hinge assemblies to move the system to an open position;
  locking the locking hinge assemblies in an open position such that the ramps of the first section are colinearly arranged with the ramps of the second section;
  positioning the system such that the first section rests against the tailgate of the vehicle having a bed and a lower edge of the second section contacts the ground;
  driving an ORV onto the ramps; and
  using the wheels to roll the system and ORV over the tailgate and into the bed while lifting up on the second section.

12. The method of claim 11, further comprising securing the ORV to the bed of the vehicle.

13. The method of claim 11, further comprising using the wheels to roll the system and ORV out of the bed while lowering the second section to the ground.

14. The method of claim 13, further comprising driving the ORV off of the system.

15. The method of claim 14, further comprising unlocking the locking hinge assemblies and moving the first section and second section back to the folded position.

16. The method of claim 15, further comprising using a pair of wheels disposed on an upper edge of the first section or a lower edge of the second section to facilitate rolling transport of the folded system to a storage location.

17. The method of claim 15, wherein unlocking the locking hinge assemblies comprises releasing pins from corresponding holes the engagement of which locks the first section and second section in the folded and open positions.

18. The method of claim 11 further comprising activating lighting disposed on a rear edge of the second section.

* * * * *